United States Patent
Ishii et al.

(10) Patent No.: US 7,876,684 B2
(45) Date of Patent: Jan. 25, 2011

(54) DATA FLOW AMOUNT CONTROL DEVICE AND METHOD

(75) Inventors: Hiroyuki Ishii, Yokosuka (JP); Tomoki Sao, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 707 days.

(21) Appl. No.: 11/843,315

(22) Filed: Aug. 22, 2007

(65) Prior Publication Data

US 2008/0049618 A1 Feb. 28, 2008

(30) Foreign Application Priority Data

Aug. 22, 2006 (JP) .......................... P2006-225767

(51) Int. Cl.
*H04J 1/16* (2006.01)
*H04L 12/28* (2006.01)

(52) U.S. Cl. .................. 370/235; 370/252; 370/412

(58) Field of Classification Search .......... 370/235, 370/252, 412, 465
See application file for complete search history.

(56) References Cited

U.S. PATENT DOCUMENTS

| | | | |
|---|---|---|---|
| 2004/0228353 A1* | 11/2004 | Balachandran et al. | 370/395.21 |
| 2005/0047416 A1* | 3/2005 | Heo et al. | 370/412 |
| 2006/0153216 A1* | 7/2006 | Hosein et al. | 370/412 |
| 2006/0256756 A1* | 11/2006 | Wakabayashi | 370/335 |
| 2007/0025321 A1* | 2/2007 | Padovani et al. | 370/347 |
| 2007/0041364 A1* | 2/2007 | Kakadia | 370/352 |
| 2007/0286124 A1* | 12/2007 | Grant et al. | 370/331 |
| 2008/0285477 A1* | 11/2008 | Kuroda et al. | 370/252 |
| 2009/0017836 A1* | 1/2009 | Lee | 455/452.2 |
| 2009/0161611 A1* | 6/2009 | Kuroda | 370/329 |

FOREIGN PATENT DOCUMENTS

| | | |
|---|---|---|
| JP | 2002-077987 | 3/2002 |
| JP | 2002-171572 | 6/2002 |
| JP | 2003-319458 | 11/2003 |
| JP | 2004-128989 | 4/2004 |
| JP | 2005-057323 | 3/2005 |

OTHER PUBLICATIONS

3rd Generation Partnership Project; Physical Layer Aspects of Utra High Speed Downlink Packet Access (Release 4), 3GPP TR 25.848, vol. 4, Mar. 2001, 89 Pages.

"3rd Generation Partnership Project 2 3GPP2, CDMA 2000 High Rate Packet Data Air Interface Specification", 3GGP2 C. S0024-A Version 1.0, Mar. 2004. 1,083 Pages.

* cited by examiner

*Primary Examiner*—Andrew Lee
(74) *Attorney, Agent, or Firm*—Oblon, Spivak, McClelland, Maier & Neustadt, L.L.P.

(57) ABSTRACT

A data flow amount control device in a mobile communication system includes a plurality of mobile stations, a control station relaying packets to each of the plurality of mobile stations, and a base station temporarily storing the packets transmitted from the control station in a buffer and transmitting the packets to each of the plurality of mobile stations. The data flow amount control device includes a radio condition acquisition unit configured to acquire a radio condition of each of the plurality of mobile stations; a packet transmission frequency calculation unit configured to calculate a transmission frequency of the packets transmitted from the base station to each of the plurality of mobile stations; and a packet transmission amount control unit configured to control a transmission amount of the packets transmitted from the control station to the base station.

10 Claims, 6 Drawing Sheets

FIG. 5

| Store_time$_n$ | A$_n$ |
|---|---|
| 0ms~100ms | 1.0 |
| 100ms~200ms | 0.8 |
| 200ms~400ms | 0.6 |
| 400ms~800ms | 0.4 |
| 800ms~ | 0.0 |

DATA FLOW AMOUNT CONTROL DEVICE AND METHOD

CROSS REFERENCE TO RELATED APPLICATION

This application is based upon and claims the benefit of priority from prior Japanese Patent Application P2006-225767 filed on Aug. 22, 2006; the entire contents of which are incorporated by reference herein.

BACKGROUND OF THE INVENTION

1. Field of the Invention

The present invention relates to a data flow amount control device and a data flow amount control method.

2. Description of the Related Art

In mobile communication systems such as cellular phones which have been widely used, services are provided with an entire service area divided into radio zones, which are referred to as cells. As shown in FIG. 1, such a mobile communication system includes a plurality of base stations covering cells, a plurality of mobile stations which perform communications by setting radio channels between the mobile stations and the base stations, and control stations which control the plurality of base stations and the mobile stations. Further, the control station is connected to a core network including an exchange and the like.

In such a configuration, signal transmission in the communications between the core network and the mobile station is performed through the control station and the base station. Thus, a base station performs relaying between a wired section and a radio section, the wired section being established between a core network and a base station via a control station, and the radio section being established between a base station and a mobile station.

The base station has a function of temporarily buffering a signal transmitted from the core network and control station. An object of the buffering function is to buffer a signal from the wired section when a transmission rate in the wired section is greater than that in the radio section.

Meanwhile, a high speed downlink packet transmission, which is of high-speed and large-volume, such as High Speed Downlink Packet Access (HSDPA) or 1× EV-DO is standardized, and also has been developed (for example, 3GPP TR25.848 v4.0.0 and 3GPP2 C. S0024 Rev. 1.0.0).

A main characteristic of such a high speed packet transmission scheme is to utilize an adaptive modulation and coding scheme in which packet transmission formats are adaptively changed according to radio conditions of a mobile station which performs a packet transmission. Here, the packet transmission formats are a data size, a modulation scheme, the number of codes, a coding rate of a packet and the like.

In this adaptive modulation and coding scheme, a radio transmission bandwidth changes with time according to a radio condition of a mobile station. For example, in the HSDPA, the data size of a packet, a modulation scheme, and the number of codes of a packet are controlled according to a radio condition between a mobile station and a radio base station, whereby an adaptive modulation and coding is performed.

Further, the above-described HSDPA or 1× EV-DO is a system in which a single radio transmission bandwidth is shared by a plurality of users, and the plurality of users share the single radio transmission bandwidth through time multiplexing, users multiplexing at the same time, or the like.

Further, the base station controls the order of transmission of packets to a plurality of mobile stations based on the instantaneous radio quality of each mobile station. Thereby, it is possible to increase throughput, that is, so-called system capacity, provided by the base station as a whole. Such a transmission order control of the packets by a radio base station is referred to as scheduling, and applying the scheduling to a packet transmission enables to increase communication capacity.

In this manner, when the single radio transmission bandwidth is shared by the plurality of users and when the scheduling is performed in the base station, a radio transmission bandwidth for each of the plurality users changes with time according to the number of the plurality of users and the way of the scheduling in the base station.

By the way, in a case of the mobile communication system configured as described above, when the transmission bandwidth of the wired section is larger than that of the radio section, packets tend to be stored in a temporal buffer of a relaying base station; and, when the transmission bandwidth of the wired section is smaller than that of the radio section, packets tend to be exhausted in the temporal buffer of the relaying base station.

Due to the limitation of the amount of the packets stored in the temporal buffer of the relaying base station, and the data overflowed from the buffer are deleted. In addition, due to the exhaustion of packets stored in the buffer of the relaying station, an entire radio bandwidth cannot be always used up.

Accordingly, when there is a difference between a transmission bandwidth in a radio section and a transmission bandwidth in a wired section, transmission efficiency is more likely to deteriorate due to the deletion of packets caused by a buffer overflow, or utilization efficiency of a radio transmission bandwidth is more likely to be reduced due to the exhaustion of the buffer.

In order to avoid the above two problems, it is necessary to control the transmission bandwidth in the radio section and the transmission bandwidth in the wired section so that these transmission bandwidths can be made as equal as possible.

From the viewpoint of suppressing the deletion of packets in a base station in communications between the core network and the mobile station, a method has been proposed in which an amount of data flow from a control station to a base station is controlled according to an amount of data stored in the buffer of the base station (Japanese Patent Application Laid-open Publication No. 2002-077987). Moreover, another method (Japanese Patent Application Laid-open Publication No. 2005-057323) has been also proposed for such a communication system in which a radio bandwidth greatly changes like a high speed packet communication scheme, and This method makes it possible to prevent deteriorations in use efficiency of a radio bandwidth and in transmission efficiency of a system, although the use efficiency deterioration might be caused by exhaustion of a buffer and the transmission efficiency deterioration might be caused due to an execution of a retransmission control required to cope with the destruction of a signal attributable to buffer overflow. Using this scheme, the amount of inflow data to the base station can be controlled according to a data amount stored in the buffer, so that a buffer overflow in the base station can be avoided.

SUMMARY OF THE INVENTION

However, the above described conventional techniques have not been made in consideration of a case where the above described single radio transmission bandwidth is shared by the plurality of users and where scheduling is performed in the base station. For this reason, these techniques do not allow proper control of an amount of packets from the control station to the base station to be performed when scheduling is performed in a base station for a plurality of existing users.

Accordingly, in view of the above described problems, an object of the present invention is to provide a data flow amount control device and a data flow amount control method for properly controlling an amount of packets from a control station to a base station.

A first aspect of the present invention is summarized as a data flow amount control device in a mobile communication system, which includes a plurality of mobile stations, a control station relaying packets to each of the plurality of mobile stations, and a base station temporarily storing the packets transmitted from the control station in a buffer and transmitting the packets to each of the plurality of mobile stations, comprising: a radio condition acquisition unit configured to acquire a radio condition of each of the plurality of mobile stations; a packet transmission frequency calculation unit configured to calculate a transmission frequency of the packets transmitted from the base station to each of the plurality of mobile stations; and a packet transmission amount control unit configured to control a transmission amount of the packets transmitted from the control station to the base station, according to the radio condition of each of the plurality of mobile stations and the transmission frequency of the packets transmitted from the base station to each of the plurality of mobile stations.

In the first aspect of the present invention, The data flow amount control device may further comprise a buffer storing amount calculation unit configured to calculate a buffer storing amount indicating an amount of the packets which are stored in the buffer of the base station and are waiting to be transmitted to each of the plurality of mobile stations, and the packet transmission amount control unit may be configured to control the transmission amount of the packets transmitted from the control station to the base station, according to the radio condition of each of the plurality of mobile stations, the transmission frequency of the packets transmitted from the base station to each of the plurality of mobile stations, and a buffer storing estimated time indicating an estimated time during which the packets to each of the plurality of mobile stations are stored in the buffer.

In the first aspect of the present invention, the data flow amount control device may further comprise a buffer storing estimated time calculation unit configured to calculate the buffer storing estimated time of the packets to each of the plurality of mobile stations according to the radio condition of each of the plurality of mobile stations, the transmission frequency of the packets transmitted from the base station to each of the plurality of mobile stations, and the buffer storing amount of the packets to each of the plurality of mobile stations.

In the first aspect of the present invention, the data flow amount control device may further comprising a factor calculation unit configured to calculate the buffer storing estimated time $Store\_time_n$ of the packets to each of the plurality of mobile stations n according to an equation $$Store\_time_n = \frac{buffer_n}{\overline{R}_n \times freq_n},$$

by using the radio condition $\overline{R}_n$ of each of the plurality of mobile stations n, the transmission frequency $freq_n$ of the packets transmitted from the base station to each of the plurality of mobile stations n; and the buffer storing amount $buffer_n$ of the packets to each of the plurality of mobile stations n, and then to calculate a factor $A_n$ of each of the plurality of mobile stations n by using the buffer storing estimated time $Store\_time_n$, and the packet transmission amount control unit may be configured to control the transmission amount of the packets from the control station to the base station, according to the radio condition of the each of plurality of mobile stations $\overline{R}_n$, the transmission frequency $freq_n$ of the packets transmitted from the base station to each of the plurality of mobile stations n, and the factor $A_n$ calculated by using the buffer storing estimated time $Store\_time_n$ of the packets to each of the plurality of mobile stations n.

In the first aspect of the present invention, the packet transmission amount control unit may be configured to calculate the transmission amount of the packets from the control station to the base station according to an equation, $$\overline{R}_n \times freq_n \times A_n,$$

In the first aspect of the present invention, the factor calculation unit may be configured to set the factor $A_n$ to be a small value when the buffer storing estimated time $Store\_time_n$ is large, and to set the factor $A_n$ to be a larger value when the buffer storing estimated time $Store\_time_n$ is small, the factor $A_n$ being calculated by using the buffer storing estimated time $Store\_time_n$ of the packets to each of the plurality of mobile stations n.

In the first aspect of the present invention, the radio condition acquisition unit may be configured to acquire the radio condition $\overline{R}_n$ of each of the plurality of mobile stations n as a packet size which each of the plurality mobile stations n can receive with a predetermined error rate and which is calculated by using radio quality information of a downlink, and a code resource and a power resource of the downlink.

In the first aspect of the present invention, the buffer storing estimated time calculation unit may be configured to calculate, among the plurality of mobile stations, an average value of the transmission frequency $freq_n$ of the packets transmitted from the base station to each of the plurality of mobile stations n, according the equation $$Freq = \frac{\sum_n freq_n}{\sum_n 1}$$

, and to calculate the buffer storing estimated time $Store\_time_n$ of the packets to each of the plurality of mobile stations n, according to an equation, $$Store\_time_n = \frac{buffer_n}{\overline{R}_n \times freq_n}, \text{ and}$$

the packet transmission amount control unit may be configured to calculate the transmission amount of the packets from the control station to the base station according to an equation, $$\overline{R}_n \times Freq \times A_n,$$

In the first aspect of the present invention, the packet transmission frequency calculation unit may be configured to calculate the transmission frequency $freq_n$ of the packets transmitted from the base station to each of the plurality of mobile stations n, according to an equation, $$\text{freq}_n(t) = \tau \cdot \text{freq}_n(t-1) + (1-\tau) \cdot \text{Allocated}_n$$

by using $\text{Allocated}_n$ which is set a value of 1 when the packets are transmitted to each of the plurality of mobile stations n at time t, and is set a value of 0 when the packet are not transmitted to each of the plurality of mobile stations at time t; and a forgetting factor $\tau$.

In the first aspect of the present invention, the buffer storing estimated time calculation unit may be configured to calculate the transmission frequency $\text{freq}_n$ of the packets transmitted from the base station to each of the plurality of mobile stations for each Priority Class, each type of service, each type of agreement, or each type of terminal.

A second aspect of the present invention is summarized as a data flow amount control method in a mobile communication system, which includes a plurality of mobile stations, a control station relaying packets to each of the plurality of mobile stations, and a base station temporarily storing the packets transmitted from the control station in a buffer and transmitting the packets to each of the plurality of mobile stations, comprising the steps of: acquiring a radio condition of each of the plurality of mobile stations; calculating a transmission frequency of the packets transmitted from the base station to each of the plurality of mobile stations; calculating a buffer storing amount indicating an amount of the packets which are stored in the buffer of the base station and are waiting to be transmitted to the plurality of mobile stations; calculating a buffer storing estimated time indicating an estimated time during which the packets to each of the plurality of mobile stations are stored in the buffer estimated to store, in the buffer, the packets to the plurality of mobile stations according to the radio condition of each of the plurality of mobile stations, the transmission frequency of the packets to each of the plurality of mobile stations, and the buffer storing amount of the packets to each of the plurality of mobile stations; and controlling the transmission amount of packets from the control station to the base station, according to the radio condition of each of the plurality of mobile stations, the transmission frequency of the packets to each of the plurality of mobile stations, and the buffer storing estimated time of the packets to each of the plurality of mobile stations.

BRIEF DESCRIPTION OF THE SEVERAL VIEWS OF THE DRAWINGS

FIG. 5 is an example of a reference table to obtain a factor $A_n$ of the present embodiment;

DETAILED DESCRIPTION OF THE INVENTION

Figure 1:
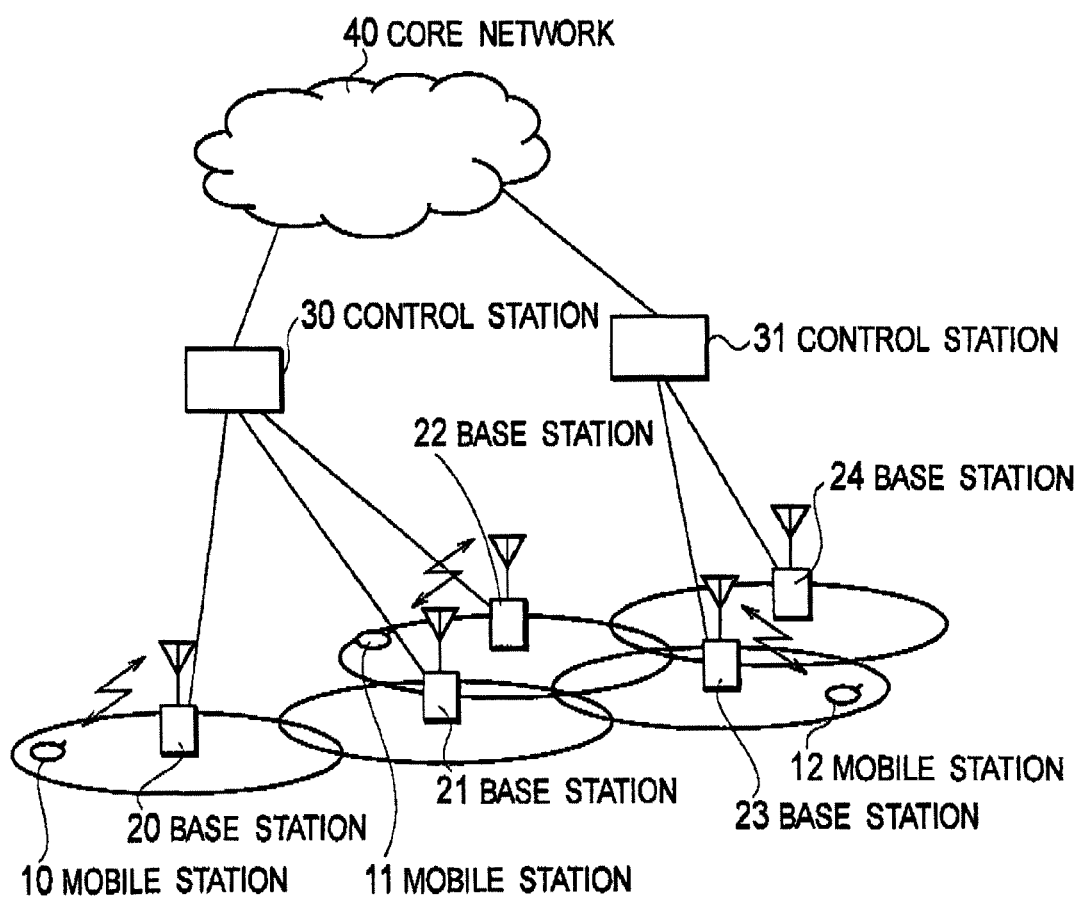
FIG. 1 is an entire configuration of a mobile communication system of a present embodiment.

Embodiment Mode for Carrying Out the Invention

Next, an embodiment of the present invention will be described with reference to the accompanying drawings. In the following description of the drawings, identical or similar constituents will be designated by identical or similar reference numerals. It is to be noted, however, that the drawings are merely schematic.

(Configuration of Mobile Communication System)

In the present embodiment, an example in the case where the present invention is applied to a mobile communication system to which an HSDPA scheme in 3GPP is applied is described in detail. Incidentally, in the following description, n is an Index of a mobile station. Also for a priority queue of a mobile station n of a base station, the same Index is used. In other words, a priority queue for the mobile station n in the base station is designated by a priority queue n. This assumes that one priority queue exists for each mobile station. Here, the priority queue is a data queue for buffering packets on the above described mobile station n in the base station.

In addition, in the following description, although it is assumed that one priority queue exists for each mobile station, a plurality of priority queues may exist for each mobile station. In that case, for example, a priority queue n for a mobile station n is designated by priority queues n, k (k is an Index of a priority queue).

FIG. 1 shows a configuration of a mobile communication system to which an HSDPA scheme in 3GPP is applied. In the above described mobile communication system, a core network 40 including an exchange, control stations 30, 31, and base stations 20 to 24 are configured in hierarchically.

Mobile stations 10 to 12 perform communications with the base stations 20, 21 via radio channels. The control station 30 is a controller which controls the base stations 20 to 22 and the mobile stations 10, 11, and the control station 31 is a controller which controls the base stations 23, 24 and the mobile station 12.

It should be noted that the configuration of the mobile communication system shown in FIG. 1 is merely an example; and the numbers of the control stations, base stations, and mobile stations, and connection configurations are not limited to these described above.

Figure 2:
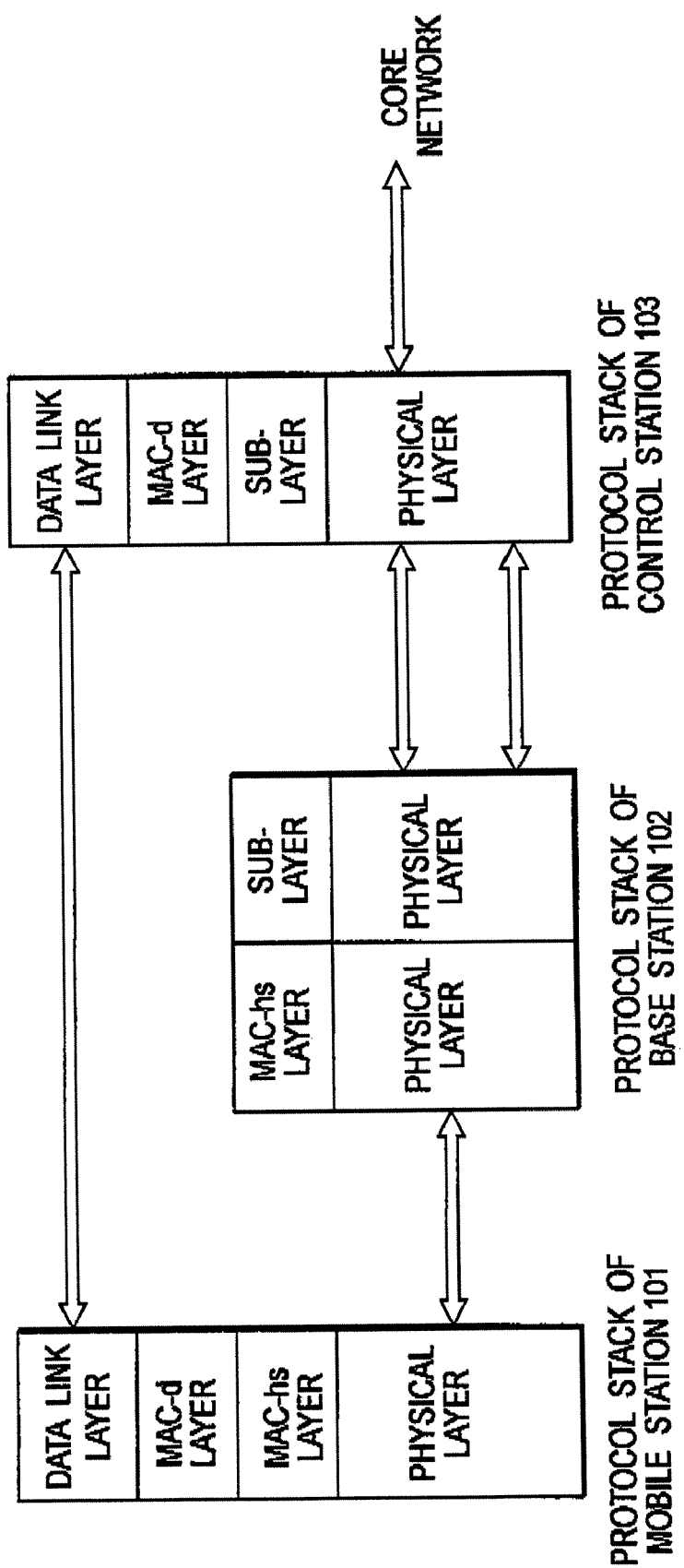
FIG. 2 is a view showing protocol stacks of the mobile communication system of the present embodiment.

FIG. 2 shows protocol stacks of the mobile communication system shown in FIG. 1. A protocol stack 101 shows a protocol stack of a mobile station, and includes a physical layer and a MAC-hs layer opposite to a base station, and a MAC-d layer and a data link layer opposite to a control station.

A protocol stack 102 shows a protocol stack of the base station, and includes a physical layer and a MAC-hs layer opposite to the mobile station, and a physical layer and a sub-layer opposite to the control station.

A protocol stack 103 shows a protocol stack of the control station, and includes a physical layer and a sub-layer opposite to the base station, and a MAC-d layer and a data link layer opposite to the mobile station. In addition, on the protocol stack 103, a layer opposite to a core network also exists.

Especially, of the above described protocol stacks, control information for controlling a transmission rate of packets at a time when the control station transmits packets to the mobile station is transmitted/received between the control station and the base station by using a sub-layer.

Figure 3:
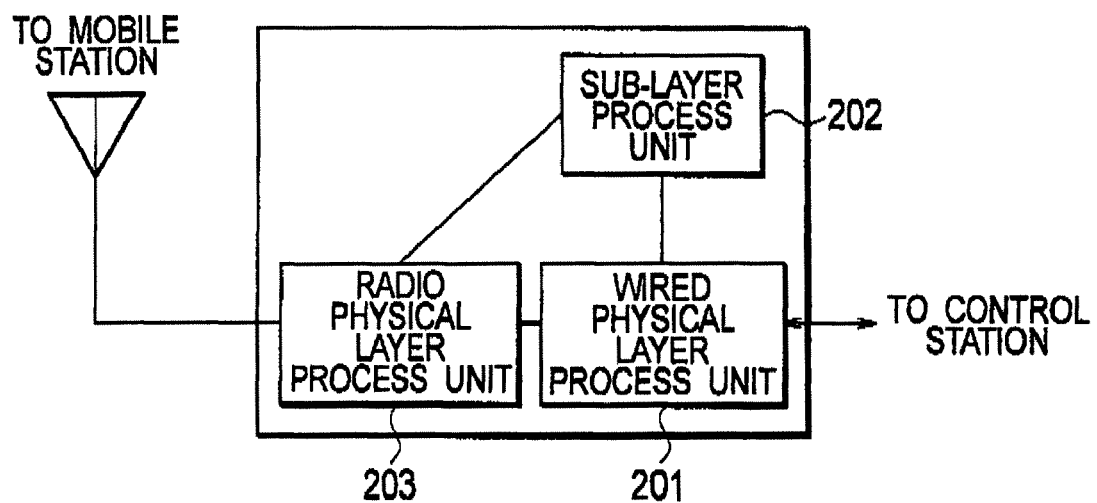
FIG. 3 is a functional block diagram of a base station of the present embodiment.

FIG. 3 shows a functional block diagram showing an example of a configuration of the base stations 20 to 24 shown in FIG. 1. For the mobile stations, 0, 1, 2, ..., n are used as Indexes as described above.

As shown in FIG. 3, the base station includes a wired physical layer process unit 201, a sub-layer process unit 202, and a radio physical layer process unit 203. It should be noted that, in FIG. 3, only part related to the data flow amount control method of the present invention is described.

The wired physical layer process unit 201 is connected to the control station, the sub-layer process unit 202, and the radio physical layer process unit 203, and receives downlink packets from the control station, and transmits the data to the radio physical layer process unit 203.

The sub-layer process unit 202 is connected to the wired physical layer process unit 201 and the radio physical layer process unit 203. The sub-layer process unit 202 performs communications with the control station on the control information.

Especially, in the present embodiment, the sub-layer process unit 202 receives transmission amount control information for controlling a transmission amount of packets, from a data transmission amount control information calculation unit 2034 to be described later. The packets are packets for a priority queue of each mobile station and packets transmitted from the control station to the base station. The sub-layer process unit 202 notifies the control station of the above described transmission amount control information through the wired physical layer process unit 201.

Here, the transmission amount control information is, in the HSDPA scheme, referred to as Capacity Allocation or HS-DSCH CAPACITY ALLOCATION (HS-DSCH CAPACITY ALLOCATION Control Frame).

The radio physical layer process unit 203 is connected to the sub-layer process unit 202 and the wired physical layer process unit 201. Further, the radio physical layer process unit 203 performs a buffering process in which downlink packets received from the wired physical layer process unit 201 are buffered, a scheduling process selecting a mobile station for allocating a shared channel (HS-DSCH) in the TTI, and transmission processes of a shared channel (HS-PDSCH as a physical channel) for the above described mobile station.

Here, the transmission processes of the selected shared channel represent, for example, a channel coding process, a spreading process, a frequency conversion process for converting into a radio frequency band, an amplification process, or the like. Although in the above described description, only the processes in the downlink of the present invention have been described, it should be noted that the radio physical layer process unit 203 also performs demodulation/decoding processes and the like in an uplink.

Further, the radio physical layer process unit 203 performs a data transmission amount control information calculation process in which transmission amount control information for controlling a transmission amount of packets being transmitted from the control station to the base station is calculated.

Figure 4:
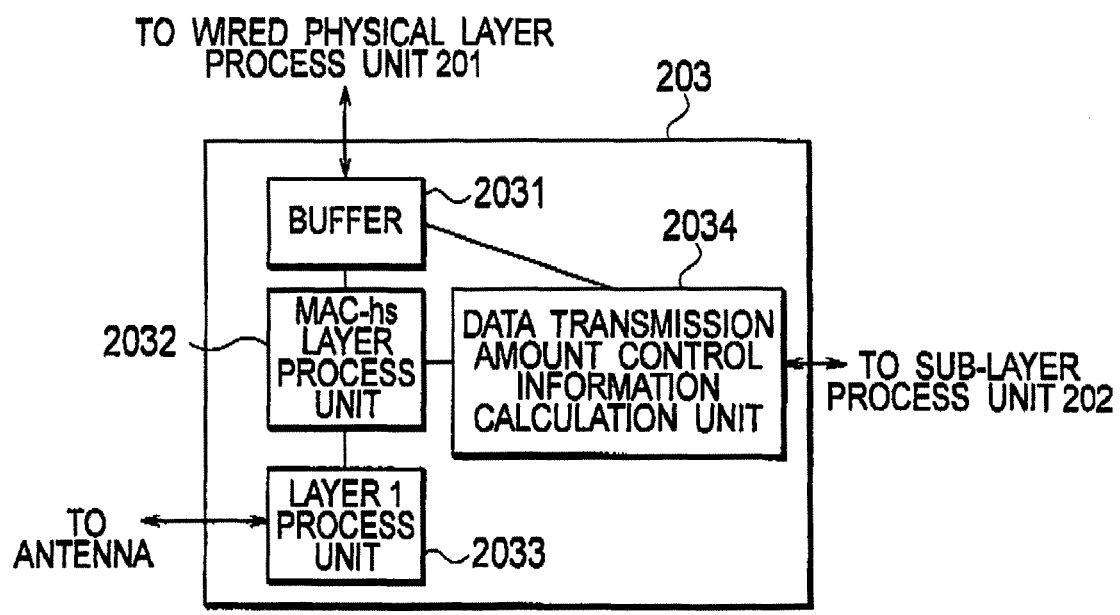
FIG. 4 is a functional block diagram showing details of a radio physical layer processor of FIG. 3.

Next, a configuration of the radio physical layer process unit 203 is described in detail. As shown in FIG. 4, the radio physical layer process unit 203 includes a buffer 2031, a MAC-hs layer process unit 2032, a layer 1 process unit 2033, and a data transmission amount control information calculation unit 2034. Further, the above-described configuration shows only elements extracted for the present invention, and those unnecessary for the present invention are omitted.

The buffer 2031 is connected to the wired physical layer process unit 201, the MAC-hs layer process unit 2032, and the data transmission amount control information calculation unit 2034.

The buffer 2031 performs buffering for temporarily storing packets which are received from the wired physical layer process unit 201 and which are transmitted from the control station to the base station. To be precise, the buffer 2031 performs buffering on packets for each priority queue n of each mobile station n.

Further, when there is a plurality of priority queues n, k of a mobile station n, buffering is performed on packets for each plurality of priority queues n, k of the above described mobile station n.

Further, the buffer 2031 obtains, from the MAC-hs layer process unit 2032, information on the mobile station to which the shared channel (HS-PDSCH) is allocated in the TTI and its priority queue, and on a data size of the shared channel. The buffer 2031, then, transmits, to the MAC-hs layer process unit 2032, packets in the above described priority queue, the packets being transmitted in the TTI, i.e., packets in the priority queue corresponding to the data size of the above described shared channel.

Further, the buffer 2031 calculates a buffer storing amount $buffer_n$ indicating an amount of packets which are stored in the priority queue n of the each mobile station n, and notifies the data transmission amount control information calculation unit 2034 of the calculated buffer storing amount $buffer_n$.

The MAC-hs layer process unit 2032 is connected to the layer 1 process unit 2033, the buffer 2031, and the data transmission amount control information calculation unit 2034.

The MAC-hs layer process unit 2032 performs a scheduling process for selecting a mobile station for allocating a shared channel (HS-PDSCH) in the TTI and a priority queue for the selected mobile station. In other words, a priority queue for transmitting packets in the TTI is selected from among all priority queues.

In this case, the base station transmits the shared channel (HS-PDSCH in the case of HSDPA) in the TTI to a mobile station corresponding to the selected priority queue. Further, as algorithms for the above described scheduling process, there are, for example, Round robin, Proportional Fairness, MAX C/I, and the like.

Subsequently, the MAC-hs layer process unit 2032 receives downlink radio quality information from the layer 1 process unit 2033. The MAC-hs layer process unit 2032, then, determines, for allocating a shared channel in the TTI, a transmission format of the shared channel in the TTI according to radio quality information of a mobile station corresponding to a selected priority queue and a radio resource available in the TTI.

The MAC-hs layer process unit 2032 notifies the buffer 2031 of information on the selected mobile station to which the shared channel is allocated in the TTI and the priority queue for the selected mobile station, and on a data size in the transmission format of the shared channel.

Here, the above described radio quality information indicates a Channel quality indicator (CQI) in HSDPA. Alternatively, as the radio quality information, for example, CPICH Ec/NO or CPICH RSCP other than the CQI may be used. Further, the radio resource available in the TTI indicates, for example, a code resource, a power resource, or a hardware resource. Still further, the transmission format of the shared channel in the TTI indicates, for example, a data size (transport block size), a modulation scheme, the number of codes, transmission power, or the like.

In addition, the MAC-hs layer process unit 2032 transmits information on the transmission format of the above described shared channel, and packets which are received from the buffer 2031 and to be transmitted in the TTI.

Further, the MAC-hs layer process unit 2032 calculates an allocation frequency indicating a frequency at which a shared channel is allocated for each priority queue n of each mobile station n, i.e., a transmission frequency of packets transmitted from the base station to each of the plurality of mobile stations.

Incidentally, the transmission frequency $\text{freq}_n$ of the packet in the TTI t can be calculated, for example, according to the following equation:

$$\text{freq}_n(t) = \tau \cdot \text{freq}_n(t-1) + (1-\tau) \cdot \text{Alocated}_n$$

by using Allocated$_n$ which is set a value of 1 when the shared channel is allocated to the priority queue n in the TTI t and is set a value of 0 when the shared channel is not allocated to the priority queue n in the TTI t and a forgetting factor $\tau$.

Here, $\tau$ denotes a factor for controlling the size of a measurement period on which the transmission frequency of the packets is measured; and, when $\tau$ is set closer to 1, the measurement period for the transmission frequency of the packets can be increased so that an amount of data flow can be controlled under consideration of a longer time interval.

Further, the transmission frequency of the packet in the TTI t is calculated as $\text{freq}_n(t)$, for example, according to the following equation:

$$\text{freq}_n(t) = \frac{\sum_{x \tau T_1}^{t} \text{Allocated}_n(x)}{T_1}$$

by using Allocated$_n$ (x) which is set a value of 1 when the shared channel is allocated to the priority queue n in the TTI x and is set a value of 0 when the shared channel is not allocated to the priority queue n in the TTI x, and an averaged period $T_1$.

Here, $T_1$ denotes a factor controlling the size of a measurement period on which the transmission frequency of the packets is measured; and, when T1 is set to a large value, the measurement period for the transmission frequency of the packets can be increased so that an amount of data flow can be controlled under consideration of a longer time interval.

Further, the MAC-hs layer process unit 2032 calculates a transmission rate $\overline{R}_n$ for each priority queue n of the each mobile station n, the transmission rate $\overline{R}_n$ being transmittable on a radio section.

The transmission rate $\overline{R}_n$ in the TTI for each priority queue n described above, which is transmittable on a radio section, is calculated, for example, according to the following equation:

$$\overline{R}_n(TTI) = \delta \cdot \overline{R}_n(TTI-1) + (1-\delta) \cdot r \, (0 \leq \delta \leq 1)$$

Here, r indicates an instantaneous transmission rate which is calculated by using radio quality information (CQI) of a mobile station n and an available radio resource. Further, $\overline{R}_n(TTI)$ indicates a transmission rate transmittable on a radio section for each priority queue n in the TTI, and $R\overline{R}_n(TTI-1)$ indicates a transmission rate transmittable on a radio section for each priority queue n in a previous TTI by one.

Further, $\delta$ indicates a forgetting factor for averaging. Controlling the value of $\delta$ enables a control of an averaged period for calculating an average transmission rate $\overline{R}_n$ transmittable on a radio section for each priority queue n. For example, when the value of $\delta$ is set closer to 1, by using a long average period, a transmission rate transmittable on a radio section can be calculated, and when the value of $\delta$ is set to 0, an instantaneous value of a transmission rate transmittable on a radio section can be calculated.

For example, the above described r indicates a data size which is assumed to be transmittable with a predetermined error rate based on the radio quality information (CQI), transmission power capable of being allocated to a shared channel HS-PDSCH, and the number of codes capable of being allocated to a shared channel HS-PDSCH. For example, when the predetermined error rate is set to 10%, an error rate, at a time when the base station transmits packets having a data size corresponding to the transmission rate r to the mobile station n in the TTI, becomes approximately 10%.

Further, the transmission rate $\overline{R}_n$ transmittable on the radio section for each priority queue n described above is calculated under the assumption that a shared channel is allocated to a mobile station n on all TTIs without considering the allocation frequency of a shared channel. In other words, the average transmission rate $\overline{R}_n$ transmittable on the above described radio section is a value corresponding to a radio condition or a radio quality in a downlink between the base station and the mobile station n.

The MAC-hs layer process unit 2032 transmits, to the data transmission amount control information calculation unit 2034, the allocation frequency of the shared channel, i.e., the transmission frequency $\text{freq}_n$ of packets, for each priority queue n of the each mobile station n, and a transmission rate $\overline{R}_n$ transmittable on a radio section for each priority queue n of each mobile station n.

The layer 1 process unit 2033 is connected to the MAC-hs layer process unit 2032, and an antenna.

The layer 1 process unit 2033 receives, from the MAC-hs layer process unit 2032, information on a transmission format of a shared channel to be transmitted in the TTI, and packets to be mapped to the shared channel, and performs a transmission process on the shared channel to be transmitted to a radio section in the TTI, based on the information on the transmission format.

To be more precise, the layer 1 process unit 2033 performs a turbo coding for packets to be mapped to the shared channel, a spreading process, a frequency conversion process for converting into a radio frequency band, an amplification process, and the like. Further, after performing the above described transmission process, a signal of the shared channel is transmitted to the radio section through the antenna.

The layer 1 process unit 2033 includes a function of receiving downlink radio quality information (CQI), which is mapped and reported by an uplink control channel (HS-DPCCH), from the each mobile station, and of demodulating/decoding the same. The downlink radio quality information of the each mobile station is transmitted to the MAC-hs layer process unit 2032.

The data transmission amount control information calculation unit 2034 is connected to the buffer 2031, the MAC-hs layer process unit 2032, and the sub-layer process unit 202.

The data transmission amount control information calculation unit 2034 receives, from the buffer 2031, the buffer storing amount buffer$_n$ of packets stored in the priority queue n of each mobile station n, and receives, from the MAC-hs layer process unit 2032, the allocation frequency of the shared channel, i.e., the transmission frequency $\text{freq}_n$ of packets, for each priority queue n of the each mobile station n, and the transmission rate $\overline{R}_n$ transmittable on a radio section for each priority queue n of each mobile station n.

The data transmission amount control information calculation unit 2034 determines transmission amount control information, i.e., a transmission rate designated in Capacity Allocation, for controlling the transmission amount of packets to be transmitted from the control station to the base station according to the buffer storing amount buffer$_n$ of packets stored in the priority queue n of the each mobile station n, the allocation frequency of the shared channel, i.e., the transmission frequency $\text{freq}_n$ of packets, for each priority queue n of each mobile station n, and the transmission rate $\overline{R}_n$ transmittable on a radio section for each priority queue n of each mobile station n.

For example, the data transmission amount control information calculation unit 2034 calculates a buffer storing estimated time Store_time$_n$ indicating an estimated time during which packets are stored in a priority queue n of each mobile station n, according to the following equation, $$\text{Store\_time}_n = \frac{\text{buffer}_n}{\overline{R}_n \times \text{freq}_n}$$

and determines a factor $A_n$ by using the value of the buffer storing estimated time Store_time$_n$. Thereafter, the data transmission amount control information calculation unit 2034 may calculate the transmission amount control information, i.e., a transmission rate $CA_n$ designated in Capacity Allocation, for controlling the transmission amount of packets to be transmitted from the control station to the base station by using the following equation:

$$CA_n = \overline{R}_n \times \text{freq}_n \times A_n$$

Here, as a method of calculating the factor $A_n$, a reference table shown in FIG. 5 may be used. For example, when the value of the buffer storing estimated time Store_time$_n$ is 300 ms, the value of the factor $A_n$ is set to 0.6.

Further, for example, the data transmission amount control information calculation unit 2034 calculates a value Freq obtained by averaging, among mobile stations, the allocation frequency of the shared channel, i.e., the transmission frequency freq$_n$ of packets, for each priority queue n of the each mobile station n according to the following equation, $$\text{Freq} = \frac{\sum_n \text{freq}_n}{\sum_n 1}$$

and, thereafter, calculates the buffer storing estimated time Store_time$_n$ of a priority queue n of each mobile station n according to the following equation, $$\text{Store\_time}_n = \frac{\text{buffer}_n}{\overline{R}_n \times \text{freq}_n}.$$

By using the calculated value of the buffer storing estimated time Store_time$_n$, the data transmission amount control information calculation unit 2034 determines a factor $A_n$, and may calculate the transmission amount control information, i.e., the transmission rate $CA_n$ designated in Capacity Allocation, for controlling the transmission amount of packets to be transmitted from the control station to the base station according to the following equation, $$CA_n = \overline{R}_n \times \text{Freq} \times A_n.$$

Incidentally, the above described Freq may be calculated for each service type and each agreement type for packets in the priority queue n of the each mobile station, each type of agreement, each type of receiver (RAKE receiver, equalizer reception diversity, interference canceller, other Capability of the mobile station n (indices classified depending on receivable demodulation scheme, the number of receivable codes the number of bits, and the like) and the like), and each type of priority class.

For example, the service type indicates a type of service in which downlink packets are transmitted, and, for example includes a VoIP service, a voice service, a streaming serving an FTP service, and the like.

The agreement type indicates a type of agreement subscribed by a user of a mobile station to which downlink packets are transmitted, and, for example, includes a Low Class agreement, a High Class agreement, and the like.

Further, the terminal type is used to classify a capability of the mobile station to which downlink packets are transmitted, and include a class based on identification information of mobile station, the presence/absence or the type of a RAKE reception function, a receive diversity, an interference canceller, and the like, and a capability of the mobile station such as a receivable modulation scheme, the number of codes, and the number of bits.

Further, a priority class indicates the degree of priority for the transmission of downlink packets. For example downlink packets of first priority are transmitted prior to downlink packets of second priority.

Further, without considering the allocation frequency of the shared channel, i.e., the transmission frequency freq$_n$ of packets, for each priority queue n of the each mobile station n, the data transmission amount control information calculation unit 2034 may calculate the buffer storing estimated time Store_time$_n$ of a priority queue n of each mobile station n, according to the following equation, $$\text{Store\_time}_n = \frac{\text{buffer}_n}{\overline{R}_n}$$

By using the value of the buffer storing estimated time Store_time$_n$, the data transmission amount control information calculation unit 2034 determines a factor $A_n$, and may calculate the transmission amount control information, i.e., the transmission rate $CA_n$ designated in Capacity Allocation, for controlling the transmission amount of packets to be transmitted from the control station to the base station according to the following equation, $$CA_n = \overline{R}_n \times A_n.$$

Further, for example, instead of using the allocation frequency of the shared channel, i.e., the transmission frequency freq$_n$ of packets, for each priority queue n of the each mobile station n, the data transmission amount control information calculation unit 2034 may calculate, using the number N of mobile stations in communication, the buffer storing estimated time and the transmission amount control information for controlling the transmission amount of packets to be transmitted from the control station to the base station.

That is, the data transmission amount control information calculation unit 2034 calculates the buffer storing estimated time Store_time$_n$ of a priority queue n of each mobile station n, according to the following equation, $$\text{Store\_time}_n = \frac{\text{buffer}_n}{\overline{R}_{n \times \frac{1}{N}}}.$$

By using the value of the buffer storing estimated time Store_time$_n$, the data transmission amount control information calculation unit 2034 determines a factor $A_n$, and may calculate the transmission amount control information, i.e., the transmission rate $CA_n$ designated in Capacity Allocation, for controlling the transmission amount of packets to be transmitted from the control station to the base station according to the following equation, $$CA_n = \overline{R}_n \times \frac{1}{N} \times A_n.$$

Here, the number N of mobile stations in communication indicates the total number of mobile stations to which packets stored in priority queues are to be transmitted. Alternatively the number N of mobile stations in communication may indicate the total number of mobile stations in each of which a dedicated channel A-DPCH associated with a shared channel (HS-PDSCH) is set.

The data transmission amount control information calculation unit 2034 notifies the sub-layer process unit 202 of the transmission amount control information, i.e., the transmission rate $CA_n$ designated in Capacity Allocation, for controlling the transmission amount of packets to be transmitted from the control station to the base station.

Figure 6:
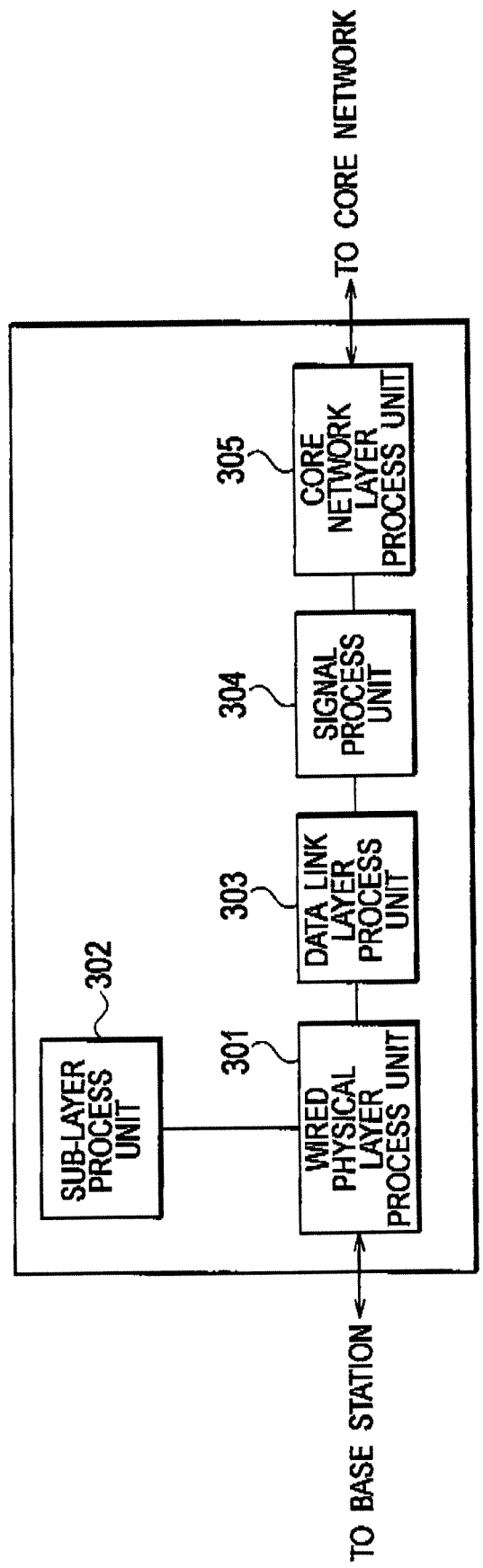
FIG. 6 is a functional block diagram of a control station of the present embodiment.

FIG. 6 shows a functional block diagram showing an example of a configuration of the control stations 30, 31 shown in FIG. 1. The control station includes a wired physical layer processor 301 performing communications with a base station a sub-layer processor 302 performing communications with a base station on control information, a data link layer processor 303 performing communications with a mobile station, a signal processor 304 performing a signal relaying process between a mobile station and a core network, buffering, and the like, and a core network layer processor 305 performing communications with a core network.

The wired physical layer processor 301 performs communication with a base station, and is connected to a base station through a wired link in the present embodiment. The sub-layer processor 302 performs communications with a base station on control information.

Especially, in the present embodiment, the sub-layer processor 302 processes transmission amount control information for controlling the transmission amount of packets to be transmitted from a control station to a base station, the information being notified by the sub-layer process unit 202 in a base station and being associated with a priority queue n of each mobile station n.

To be more precise, the sub-layer processor 302 receives the transmission amount control information notified by the sub-layer process unit 202, i.e., information (Capacity Allocation) showing a transmission rate at a time when packets to a mobile station n are transmitted, and controls a transmission rate of the packets transmitted from the control station to the base station i.e., a transmission rate, based on the received information.

The data link layer processor 303 performs communications with a mobile station n, and the signal processor 304 performs relaying processes on data such as a voice signal and packet to be transmitted/received between a mobile station n and a core network. The core network layer processor 305 establishes communication with a core network.

Incidentally, in the above described embodiment, the functions of the MAC-hs layer process unit 2032 and the layer 1 process unit 2033 correspond to a radio condition acquisition unit, a packet transmission frequency calculation unit, and a buffer storing amount calculation unit; and the function of the data transmission amount control information calculation unit 2034 corresponds to a packet transmission amount control unit.

Further, in the above described embodiment, a base station and a control station correspond to a data flow amount control device.

(Data Flow Amount Control Method)

Figure 7:
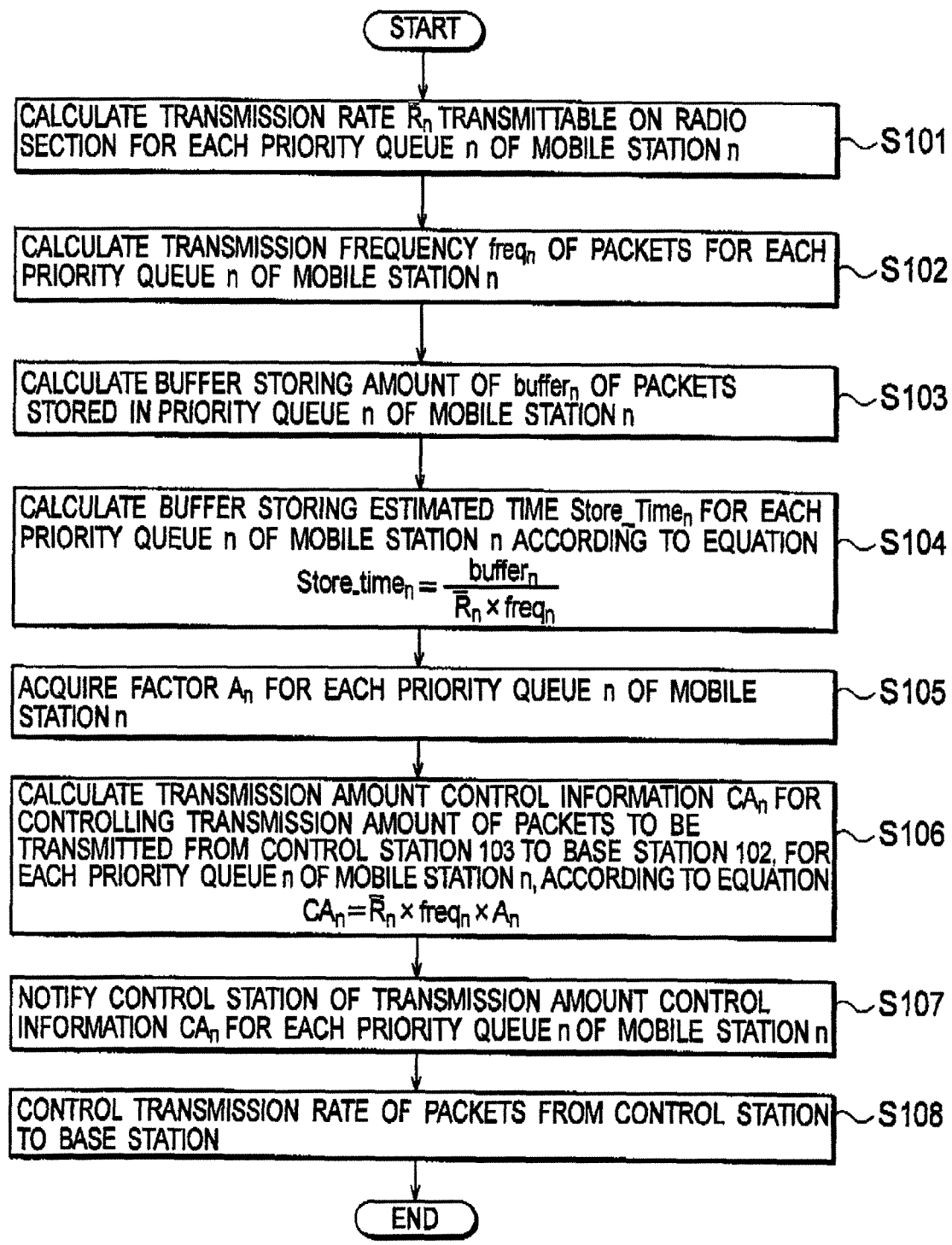
FIG. 7 is a flowchart showing a method of controlling an amount of inflow data of the present embodiment.

Next, operation of a data flow amount control method of the present invention is described with reference to a flowchart shown in FIG. 7.

In Step S101, the MAC-hs layer process unit 2032 of the radio physical layer process unit 203 calculates the transmission rate $\overline{R}_n$ transmittable on a radio section for each priority queue n of each mobile station n.

In Step S102, the MAC-hs layer process unit 2032 of the radio physical layer process unit 203 calculates the allocation frequency of the shared channel, i.e., the transmission frequency $freq_n$ of packets, for each priority queue n of the each mobile station n.

In Step S103, the buffer 2031 of the radio physical layer process unit 203 calculates the buffer storing amount $buffer_n$ of packets stored in a priority queue n of each mobile station n.

In Step S104, the data transmission amount control information calculation unit 2034 of the radio physical layer process unit 203 calculates the buffer storing estimated time $Store\_time_n$ of a priority queue n of each mobile station n according to the following equation, $$Store\_time_n = \frac{buffer_n}{\overline{R}_n \times freq_n}$$

In Step S105, the data transmission amount control information calculation unit 2034 of the radio physical layer process unit 203 calculates a factor $A_n$ for a priority queue n of each mobile station n by using the buffer storing estimated time $Store\_time_n$ of a priority queue n of each mobile station n.

In Step S106, the data transmission amount control information calculation unit 2034 of the radio physical layer process unit 203 calculates the transmission amount control information, i.e., a transmission rate $CA_n$ designated in Capacity Allocation, for controlling the transmission amount of packets to be transmitted from a control station to a base station, for each priority queue n of each mobile station n according to the following equation, $$CA_n \overline{R}_n \times freq_n \times A_n$$

In Step S107, the sub-layer process unit 202 of the base station notifies the control station of the transmission amount control information (Capacity Allocation) for controlling the transmission amount of packets to be transmitted from a control station to a base station, the transmission amount control information for a priority queue n of each mobile station n.

In Step S108, the sub-layer processor 302 of the control station controls a transmission rate of packets from the control station to the base station according to the transmission amount control information (Capacity Allocation) for controlling the transmission amount of packets to be transmitted from a control station to a base station, the transmission amount control information being for a priority queue n of each mobile station n.

Here, in the example described above, in Step S104, the buffer storing estimated time Store_time$_n$ of a priority queue n of each mobile station n is calculated, according to the following equation, $$\text{Store\_time}_n = \frac{buffer_n}{\overline{R}_n \times freq_n}$$

and, in Step S106, the transmission amount control information i.e., the value CA$_n$ of Capacity Allocation, for controlling the transmission amount of packets to be transmitted from a control station to a base station, for each priority queue n of each mobile station n is calculated according to the following equation, $$CA_n = \overline{R}_n \times freq_n \times A_n.$$

Alternatively, in Step S104, the buffer storing estimated time Store_time$_n$ of a priority queue n of each mobile station n may be calculated, according to the following equation, $$\text{Store\_time}_n = \frac{buffer_n}{\overline{R}_n \times Freq}$$

(Here, Freq denotes an average value obtained by averaging among mobile stations, the allocation frequency of the shared channel, i.e., the transmission frequency freq$_n$ of packets, for each priority queue n of each mobile station n), and, in Step S106, the transmission amount control information, i.e., the transmission rate CA$_n$ designated in Capacity Allocation, for controlling the transmission amount of packets to be transmitted from a control station to a base station, for each priority queue n of each mobile station n may be calculated according to the following equation, $$CA_n \overline{R}_n \times \text{Freq} \times A_n$$

Further, alternatively, in Step S104, the buffer storing estimated time Store_time$_n$ of a priority queue n of each mobile station n may be calculated according to the following equation, $$\text{Store\_time}_n = \frac{buffer_n}{\overline{R}_n}$$

and, in Step S106, the transmission amount control information i.e., the transmission rate CA$_n$ designated in Capacity Allocation, for controlling the transmission amount of packets to be transmitted from a control station to a base station, for each priority queue n of each mobile station n may be calculated according to the following equation, $$CA_n = \overline{R}_n \times A_n$$

Still further, alternatively, in Step S102, instead of calculating the allocation frequency of the shared channel i.e., the transmission frequency freq$_n$ of packets, for each priority queue n the each mobile station n, the number N of mobile stations in communication may be calculated, and, in Step S104, the buffer storing estimated time Store_time$_n$ of a priority queue n of each mobile station n may be calculated according to the following equation, $$\text{Store\_time}_n = \frac{buffer_n}{\overline{R}_{n \times \frac{1}{N}}}$$

And in Step S106, the transmission amount control information, i.e., the value CA$_n$ of Capacity Allocation, for controlling the transmission amount of packets to be transmitted from a control station to a base station, for each priority queue n of each mobile station n is calculated according to the following equation, $$CA_n = \overline{R}_n \times \frac{1}{N} \times A_n$$

Here, the number N of mobile stations in communication indicates the total number of mobile stations to which packets stored in priority queues are to be transmitted. Alternatively the number N of mobile stations in communication may indicate the total number of mobile stations in each of which a dedicated channel A-DPCH associated with a shared channel (HS-PDSCH) is set.

(Operation and Effect)

As described above, according to the embodiment described above, when scheduling is performed in a base station for a plurality of users, a proper control of a data flow amount from a control station to a base station can be performed.

That is, for a priority queue n of a mobile station n according to a radio condition of each mobile station n and a frequency at which a shared channel is transmitted to each mobile station, it is possible to properly control the transmission amount of packets from a control station to a base station. Further it is possible to prevent deteriorations in use efficiency of a radio bandwidth and in transmission efficiency of a system, although the use efficiency deterioration might be caused by exhaustion of a buffer and the transmission efficiency deterioration might be caused by a retransmission control occurred by the deletion of packets when a buffer is overflowed.

Other Embodiment

Although the present invention is described using the embodiment described above, it is to be understood that the invention is not to be considered limited to what is in the description and the drawings, which constitutes part of this disclosure. Because of this disclosure, variations or modifications of the embodiments described above are obvious to those skilled in the art.

For example, the MAC-hs layer process unit 2032 and the data transmission amount control information calculation unit 2034 of the radio physical layer process unit 203 are configured of a CPU, a digital signal processor (DSP), or by a programmable device, in which a program is capable of being rewritten, such as a FPGA, and configured so that an evaluation function program is stored in a predetermined memory area, and factors ($\delta$, $\tau$, $\alpha$, $T_1$, $T_2$, a reference table for obtaining a factor $A_n$) are downloaded for rewriting.

At this time, the above factors ($\delta$, $\tau$, $\alpha$, $T_1$, $T_2$, a reference table for obtaining a factor $A_n$) may be downloaded from a higher node of a base station, or may be directly read in terminals I/F (external interface function) which are provided to the MAC-hs layer process unit 2032 and the data transmission amount control information calculation unit 2034.

Further, respective functional blocks of the wired physical layer processor 203 may be divided with hardware in some case, or may be divided as software using programs in a processor in another case.

Further, in the embodiments described above, although a high speed packet transmission scheme HSDPA in 3GPP is described, the present invention is not limited to the HSDPA, and is applicable to another high speed packet transmission scheme which performs a control of an amount of data flow (flow control) of downlink packets in a mobile communication system. For example, cdma 2000 1×EV-DO in 3GPP2, a TDD scheme in 3GPP, a high speed packet transmission scheme in Long Term Evolution (Super 3G), or the like is cited as another high speed packet transmission scheme.

As described above, it is certain that the present invention includes variations and modifications of the embodiments which are not described in this specification. Accordingly, the scope of the present invention is defined by the appended claims rather than by the foregoing description.

What is claimed is:

1. A data flow amount control device in a mobile communication system, which includes a plurality of mobile stations, a control station relaying packets to each of the plurality of mobile stations, and a base station temporarily storing the packets transmitted from the control station in a buffer and transmitting the packets to each of the plurality of mobile stations, comprising:
 a radio condition acquisition unit configured to acquire a radio condition of each of the plurality of mobile stations;
 a packet transmission frequency calculation unit configured to calculate a transmission frequency of the packets transmitted from the base station to each of the plurality of mobile stations;
 a packet transmission amount control unit configured to control a transmission amount of the packets transmitted from the control station to the base station, according to the radio condition of each of the plurality of mobile stations and the transmission frequency of the packets transmitted from the base station to each of the plurality of mobile stations; and
 a buffer storing amount calculation unit configured to calculate a buffer storing amount indicating an amount of the packets which are stored in the buffer of the base station and are waiting to be transmitted to each of the plurality of mobile stations,
 wherein the packet transmission amount control unit is configured to control the transmission amount of the packets transmitted from the control station to the base station, according to the radio condition of each of the plurality of mobile stations, the transmission frequency of the packets transmitted from the base station to each of the plurality of mobile stations, and a buffer storing estimated time indicating an estimated time during which the packets to each of the plurality of mobile stations are stored in the buffer.

2. The data flow amount control device according to claim 1, further comprising a buffer storing estimated time calculation unit configured to calculate the buffer storing estimated time of the packets to each of the plurality of mobile stations according to the radio condition of each of the plurality of mobile stations, the transmission frequency of the packets transmitted from the base station to each of the plurality of mobile stations, and the buffer storing amount of the packets to each of the plurality of mobile stations.

3. The data flow amount control device according to claim 2, further comprising a factor calculation unit configured to calculate the buffer storing estimated time $Store\_time_n$ of the packets to each of the plurality of mobile stations n according to an equation $Store\_time_n = buffer_n/R_n \times freq_n$, by using the radio condition $R_n$ of each of the plurality of mobile stations n, the transmission frequency $freq_n$ of the packets transmitted from the base station to each of the plurality of mobile stations n; and the buffer storing amount $buffer_n$ of the packets to each of the plurality of mobile stations n, and then to calculate a factor $A_n$ of each of the plurality of mobile stations n by using the buffer storing estimated time $Store\_time_n$, and
 wherein the packet transmission amount control unit is configured to control the transmission amount of the packets from the control station to the base station, according to the radio condition of the each of plurality of mobile stations $R_n$, the transmission frequency $freq_n$ of the packets transmitted from the base station to each of the plurality of mobile stations n, and the factor $A_n$ calculated by using the buffer storing estimated time $Store\_time_n$ of the packets to each of the plurality of mobile stations n.

4. The data flow amount control device according to claim 3, wherein the packet transmission amount control unit is configured to calculate the transmission amount of the packets from the control station to the base station according to an equation, $R_n \times freq_n \times A_n$.

5. The data flow amount control device according to claim 3 wherein the factor calculation unit is configured to set the factor $A_n$ to be a small value when the buffer storing estimated time $Store\_time_n$ is large, and to set the factor $A_n$ to be a larger value when the buffer storing estimated time $Store\_time_n$ is small, the factor $A_n$ being calculated by using the buffer storing estimated time $Store\_time_n$ of the packets to each of the plurality of mobile stations n.

6. The data flow amount control device according to claim 1 wherein the radio condition acquisition unit is configured to acquire the radio condition $R_n$ of each of the plurality of mobile stations n as a packet size which each of the plurality mobile stations n can receive with a predetermined error rate and which is calculated by using radio quality information of a downlink, and a code resource and a power resource of the downlink.

7. The data flow amount control device according to claim 2, wherein the buffer storing estimated time calculation unit is configured to calculate, among the plurality of mobile stations an average value of the transmission frequency $freq_n$ of the packets transmitted from the base station to each of the plurality of mobile stations n, according the equation $Freq = \Sigma freq_n/\Sigma 1$, and to calculate the buffer storing estimated time $Store\_time_n$ of the packets to each of the plurality of mobile stations n, according to an equation, $Store\_time_n = buffer_n/R_n \times freq_n$, and
 the packet transmission amount control unit is configured to calculate the transmission amount of the packets from the control station to the base station according to an equation, $R_n \times Freq \times A_n$.

8. The data flow amount control device according to claim 1 wherein the packet transmission frequency calculation unit is configured to calculate the transmission frequency $freq_n$ of the packets transmitted from the base station to each of the plurality of mobile stations n, according to an equation, $$freq_n(t) = \tau freq_n(t-1) + (1-\tau)Allocated_n$$

by using $Allocated_n$ which is set a value of 1 when the packets are transmitted to each of the plurality of mobile stations n at time t, and is set a value of 0 when the packets are not transmitted to each of the plurality of mobile stations at time t; and a forgetting factor τ.

9. The data flow amount control device according to claim 7, wherein the buffer storing estimated time calculation unit is configured to calculate the transmission frequency $freq_n$ of the packets transmitted from the base station to each of the plurality of mobile stations for each Priority Class, each type of service, each type of agreement, or each type of terminal.

10. A data flow amount control method in a mobile communication system, which includes a plurality of mobile stations, a control station relaying packets to each of the plurality of mobile stations, and a base station temporarily storing the packets transmitted from the control station in a buffer and transmitting the packets to each of the plurality of mobile stations, comprising the steps of:

acquiring a radio condition of each of the plurality of mobile stations;

calculating a transmission frequency of the packets transmitted from the base station to each of the plurality of mobile stations;

calculating a buffer storing amount indicating an amount of the packets which are stored in the buffer of the base station and are waiting to be transmitted to the plurality of mobile stations;

calculating a buffer storing estimated time indicating an estimated time during which the packets to each of the plurality of mobile stations are stored in the buffer; and controlling the transmission amount of packets from the control station to the base station, according to the radio condition of each of the plurality of mobile stations, the transmission frequency of the packets to each of the plurality of mobile stations, and the buffer storing estimated time of the packets to each of the plurality of mobile stations.

* * * * *